(12) United States Patent
Tordo et al.

(10) Patent No.: US 12,139,912 B2
(45) Date of Patent: Nov. 12, 2024

(54) FOLDABLE TRUSS STRUCTURE, IN PARTICULAR FOR SOLAR TRACKER

(71) Applicant: NEXANS, Courbevoie (FR)

(72) Inventors: Jérome Tordo, Aix-en-Provence (FR); Fabien Viennois, Messery (FR); Christophe Micoli, Marseilles (FR)

(73) Assignee: NEXANS, Courbevoie (FR)

( * ) Notice: Subject to any disclaimer, the term of this patent is extended or adjusted under 35 U.S.C. 154(b) by 222 days.

(21) Appl. No.: 17/625,669

(22) PCT Filed: Jun. 16, 2020

(86) PCT No.: PCT/FR2020/051032
§ 371 (c)(1),
(2) Date: Jan. 7, 2022

(87) PCT Pub. No.: WO2021/009424
PCT Pub. Date: Jan. 21, 2021

(65) Prior Publication Data
US 2022/0259862 A1    Aug. 18, 2022

(30) Foreign Application Priority Data
Jul. 15, 2019 (FR) ..................................... 19 07918

(51) Int. Cl.
*E04C 3/08* (2006.01)
*E04B 1/343* (2006.01)
(Continued)

(52) U.S. Cl.
CPC ................ *E04C 3/08* (2013.01); *E04B 1/343* (2013.01); *F24S 30/40* (2018.05); *H02S 20/32* (2014.12);
(Continued)

(58) Field of Classification Search
CPC ...... E04C 3/08; E04C 3/04; E04C 2003/0469; E04C 2003/0491; E04C 2003/0495;
(Continued)

(56) References Cited

U.S. PATENT DOCUMENTS

| 5,228,258 A | 7/1993 | Onoda et al. |
| 2009/0057505 A1* | 3/2009 | Chen ...................... B62K 21/24 248/185.1 |

(Continued)

FOREIGN PATENT DOCUMENTS

| FR | 2470329 | 5/1981 | |
| GB | 2063959 A * | 6/1981 | ............... B64G 9/00 |

(Continued)

OTHER PUBLICATIONS

International Search Report dated Sep. 1, 2020.

*Primary Examiner* — Devina Pillay
(74) *Attorney, Agent, or Firm* — Sofer & Haroun, LLP

(57) ABSTRACT

The invention concerns a truss structure including a plurality of longitudinal members extending parallel to one another in a main extension direction and crossmembers (9) distributed in the main extension direction to connect the longitudinal members mechanically two-by-two, forming a plurality of polygons (11) each contained in a plane perpendicular to the main extension direction.

According to the invention, each crossmember (9) connecting two longitudinal members includes a first half-crossmember (9a) with a first end connected to one of the two longitudinal members so as to be able to pivot about a first axis (X1-X'1) and a second half-crossmember (9b) a first end of which is connected to the other of the two longitudinal members so as to be able to pivot about a second axis (X2-X'2). The two half-crossmembers are connected to one another by an articulation hinge (13) allowing relative rotation of the two half-crossmembers (9a, 9b) about a third (Continued)

axis (X3-X'3). The first, second and third axes are parallel to one another and orthogonal to the main extension direction, allowing the truss structure and each crossmember (9) to pass from a deployed position to a folded position in which the first and the second half-crossmembers (9a, 9b) of each crossmember (9) extend substantially parallel one alongside the other in said main extension direction.

14 Claims, 6 Drawing Sheets

(51) Int. Cl.
    *E04C 3/04*     (2006.01)
    *F24S 30/40*     (2018.01)
    *H02S 20/32*     (2014.01)

(52) U.S. Cl.
    CPC ............... *E04C 2003/0469* (2013.01); *E04C 2003/0491* (2013.01)

(58) Field of Classification Search
    CPC ...... E04B 1/343; E04B 1/3441; E04B 1/3445; E04B 1/344; F24S 30/40; F24S 2025/012; F24S 25/70; F24S 25/13; F24S 30/425; H02S 20/32; Y02E 10/47; E04H 15/48; E04H 15/46; E04H 15/405; F16M 11/38
    See application file for complete search history.

(56) References Cited

U.S. PATENT DOCUMENTS

| | | |
|---|---|---|
| 2013/0334159 A1 | 12/2013 | Daas et al. |
| 2017/0009803 A1* | 1/2017 | Parsons .................. F16M 11/06 |
| 2019/0199277 A1* | 6/2019 | Tordo ...................... F24S 25/13 |

FOREIGN PATENT DOCUMENTS

| | | | |
|---|---|---|---|
| WO | WO-9222716 A1 * | 12/1992 | ............ E04B 1/3511 |
| WO | WO-2018033561 A1 * | 2/2018 | ............ F16B 7/0406 |
| WO | 2018121778 | 7/2018 | |

\* cited by examiner (d)　(c)　(b)　(a)

FOLDABLE TRUSS STRUCTURE, IN PARTICULAR FOR SOLAR TRACKER

RELATED APPLICATION

This application is a National Phase of PCT/FR2020/051032 filed on Jun. 16, 2020, which claims the benefit of priority from French Patent Application No. 19 07918, filed on Jul. 15, 2019, the entirety of which are incorporated by reference.

TECHNICAL FIELD

The present invention is generally concerned with truss structures including a plurality of parallel longitudinal members connected to one another by crossmembers.

The invention more particularly concerns a truss structure including:
- an assembly constituted of a number greater than or equal to two of longitudinal members extending parallel to one another in a main extension direction; and
- crossmembers distributed along the main extension direction and configured to connect the longitudinal members mechanically two by two so that the crossmembers are able to form a plurality of polygons each contained in a plane perpendicular to said main extension direction.

Technological Background

This kind of truss structure is already known and used in particular as described in the document WO 2018/033495 in the name of the Applicant to serve as a support structure for a table of a solar tracker equipped with at least one solar energy collector device.

A solar tracker is a device that supports photovoltaic panels and that is motorized so that the panels remain at all times oriented facing the sun throughout the day. The object of this kind of device is to increase the efficiency of the photovoltaic panels.

One of the major things at stake consists in obtaining a unit cost of the collected energy that is as low as possible. Reducing this unit cost relies on increasing the efficiency of the solar farms, but also on reducing the costs of installing and maintaining those solar farms.

The truss structure as described in the document WO 2018/033495 has a very serious impact on the transport and installation costs given, on the one hand, the large number of components that it is necessary to assemble together to form the structure and, on the other hand, the large volume of that structure.

SUMMARY OF THE INVENTION

The present invention proposes improvements to truss structures of the type described in the document WO 2018/033495 with the aims of facilitating the transport of those structures to their assembly site, optimizing the time taken to install them on site, facilitating installation and guaranteeing the quality of the assembly.

To be more specific, the present invention has for object a truss structure including:
- an assembly constituted of a number greater than or equal to two of longitudinal members extending parallel to one another in a main extension direction; and
- crossmembers distributed along the main extension direction and configured to connect the longitudinal members mechanically two by two so that the crossmembers are able to form a plurality of polygons each contained in a plane perpendicular to said main extension direction;

the truss structure being characterized in that each crossmember connecting two longitudinal members includes:
- a first half-crossmember that has a first end connected in a pivoting manner to one of the two longitudinal members so as to be able to pivot about a first rotation axis and a second end opposite the first end; and
- a second half-crossmember that has a first end connected in a pivoting manner to the other of the two longitudinal members so as to be able to pivot about a second rotation axis and a second end connected to the second end of the first half-crossmember by an articulation hinge allowing relative rotation of the two half-crossmembers about a third rotation axis, the first, second and third rotation axes being parallel to one another and orthogonal to said main extension direction so as to allow the truss structure and each crossmember to pass from a deployed position to a folded position and vice versa, said deployed position corresponding to a position in which the first and the second half-crossmembers of each crossmember extend in line with one another in a direction orthogonal to said main extension direction so that the crossmembers form said plurality of polygons, and said folded position corresponding to a position in which the first and the second half-crossmembers of each crossmember extend substantially parallel one alongside the other along said main extension direction.

According to other advantageous and nonlimiting features of the truss structure according to the invention:
- said assembly may be constituted of three longitudinal members, the polygons are formed by the crossmembers in the deployed position being triangles;
- the first ends of the half-crossmembers are connected in a pivoting manner to the longitudinal members, preferably by means of plates fixed to the longitudinal members;
- in the deployed position the structure may include at least one tie-rod mechanically connecting two plates of two longitudinal members between two apexes of two successive polygons;
- said at least one tie-rod comprises two ends each connected in an articulated manner to one of the two plates, one of the two ends being able to be disconnected so as to allow the passage of the structure from its deployed position to its folded position;
- in the folded position said at least one tie-rod extends substantially in said main extension direction;
- the articulation hinge of each crossmember can be able to be locked in the deployed position and unlocked to allow folding of the crossmembers and of the truss structure;
- the articulation hinge of each crossmember includes a first sleeve fixed to one end of one of the two half-crossmembers and a second sleeve fixed to an end of the other of the two half-crossmembers, each sleeve comprising at its periphery: a first and a second lateral lug extending facing and radially relative to the sleeve and each pierced by an orifice; a third lateral lug extending radially relative to the sleeve and diametrically opposite the first and second lateral lugs, said third lateral lug being also pierced by an orifice;

in one possible configuration the third lateral lug of the first sleeve can come to be placed between the first and second lateral lugs of the second sleeve with their corresponding orifices aligned to receive a first locking pin; and the third lateral lug of the second sleeve can come to be placed between the first and second lateral lugs of the first sleeve with their corresponding orifices aligned to receive a second locking pin;

said third rotation axis may be defined by the longitudinal axis of the first locking pin when the latter is received through the corresponding orifices in the absence of the second locking pin;

alternatively, said third rotation axis is defined by the longitudinal axis of the second locking pin when the latter is received through the corresponding orifices in the absence of the first locking pin;

the first locking pin and/or the second locking pin preferably include(s) a conical elastic flange for rapid assembly by clipping;

the end of one of the two half-crossmembers may have a male cone shape that can be received in a female counter-cone shape provided at the end of the other of the two half-crossmembers in the deployed position;

the truss structure constitutes for example a support structure able to support at least partly a table of a solar tracker equipped with at least one solar energy collector device.

The present invention also has for object a solar tracker comprising:

a mobile device comprising a table equipped with at least one solar energy collector device, a support structure extending longitudinally over a length L to support said table, a first support arch and a second support arch configured to support said support structure;

a first ground support and a second ground support respectively configured to support the first support arch and the second support arch; and a kinematic driving device configured to drive the mobile device in rotation relative to the first ground support and to the second ground support; the solar tracker being characterized in that said support structure includes at least one truss structure according to the invention.

In some cases, said support structure may be composed of a plurality of truss structures connected end-to-end.

BRIEF DESCRIPTION OF THE FIGURES

The following description with reference to the appended drawings, provided by way of nonlimiting example, will clearly explain in what the invention consists and how it may be executed. In the appended figures.

DESCRIPTION OF EMBODIMENTS

In the figures, identical or equivalent elements will bear the same reference signs.

Figure 1:
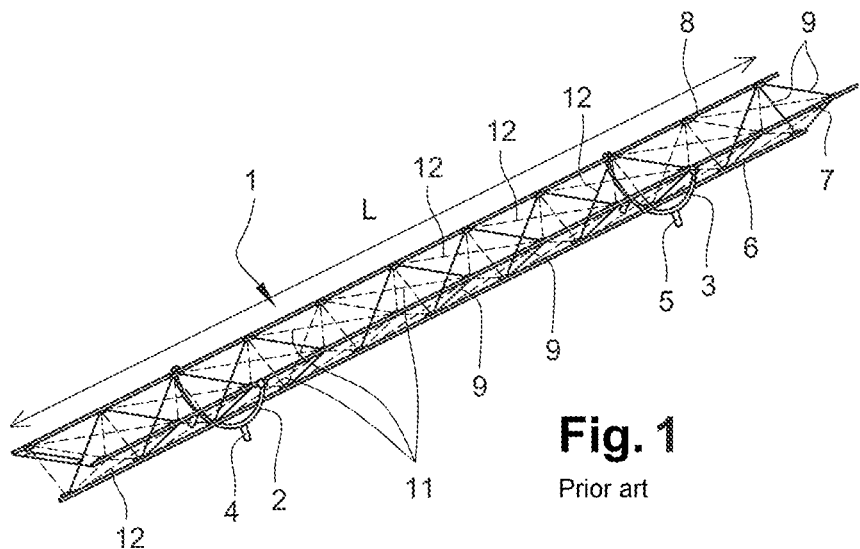
FIG. 1 illustrates certain elements of a mobile device of a solar tracker, showing in particular a known support truss structure.
Figure 2:
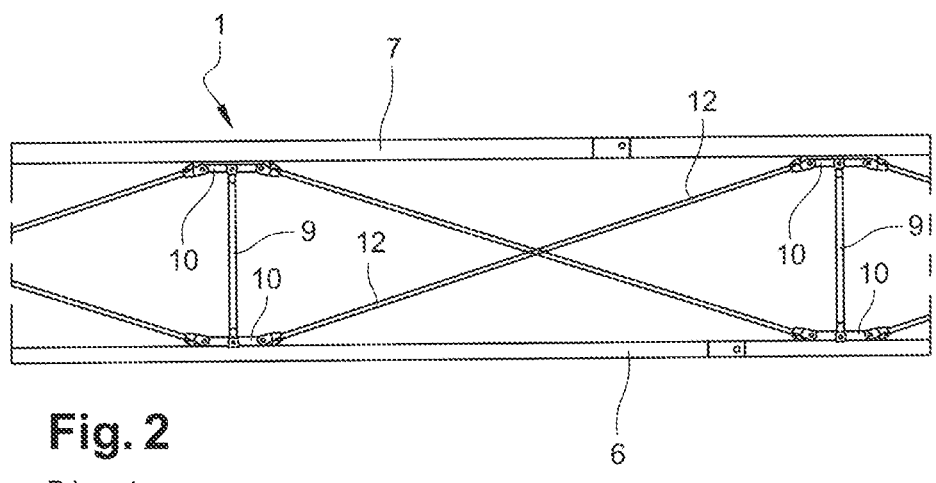
FIG. 2 illustrates partially a side view of the truss support structure from FIG. 1.

FIGS. 1 and 2 represent certain components of a solar tracker known in particular from the document WO 2018/033495. That solar tracker essentially comprises:

a mobile device including a table (not represented) equipped with at least one solar energy collector device, for example a photovoltaic panel, and a support structure 1 that extends longitudinally over a length L to support the table, a first support arch 2 and a second support arch 3 configured to support the support structure 1;

a first ground support 4 and a second ground support 5 respectively configured to support the first support arch 2 and the second support arch 3.

In the nonlimiting embodiment represented the first support arch 2 and the second support arch 3 are disposed at a certain distance relative to the ends of the support structure 1. The support structure 1 is therefore disposed cantilever fashion on the first ground support 4 via the first support arch 2 and on the second ground support 5 via the second support arch 3, which enables an advantageous distribution of the mechanical stresses to which the support structure 1 is subjected, enabling reduction of the weight and of the deformation (sag) of the mobile device whilst preserving a high mechanical strength.

The support structure 1 is a truss structure including an assembly constituted here of three longitudinal members 6, 7 and 8 that extend parallel to one another in the main extension direction and a large number of crossmembers 9 distributed along the main extension direction to connect mechanically each of the three longitudinal members two-by-two.

Each of the two ends of each crossmember 9 is connected to one of the three longitudinal members 6, 7 or 8 by means of a plate 10 fixed to that longitudinal member.

As can be seen more particularly in FIG. 1, the crossmembers 9 are disposed relative to the three longitudinal members 6, 7 and 8 so as to form a plurality of triangles 11 parallel to one another and each contained in a plane perpendicular to the main extension direction. The triangles may be regularly distributed along the main extension direction. Alternatively, there may be provision for locally increasing the density of the triangles in the zones of the structure where it is wished to increase the mechanical strength, for example at the level of one or both of the first and second support arches 2 and 3.

In the nonlimiting embodiment represented the support structure 1 also includes tie-rods 12. These tie-rods 12 are disposed so as to connect two triangles 11 two-by-two. For example, as can be seen in FIG. 2, two tie-rods 12 connect two consecutive triangles by their ends connected on the one hand, for each tie-rod 12, at the level of a corresponding plate 10 fixed to the longitudinal member 7 and on the other hand, at the level of another, corresponding plate 10 fixed to the longitudinal member 6. The tie-rods 12 may advantageously be stressed in tension so as to increase the mechanical strength of the support structure 1. As can be seen in FIG. 1 the structure may include a large number of tie-rods 12, each tie-rod connecting two apexes of two consecutive triangles 11.

As indicated in the introduction, assembling the longitudinal members, crossmembers and where applicable tie-rods constituting the support structure is a time-consuming operation, whether that assembly is done directly on the installation site or beforehand. Moreover, even if the structure is pre-assembled before transporting it to the installation site, the costs linked to transporting the pre-assembled structure are high, in particular because of the overall size of that structure.

The improvements made to the support structure conforming to the invention will now be explained with reference to FIGS. 3 to 12.

The aim of the improvements is to render the truss structure foldable, in particular to facilitate transporting it. The structure can therefore be pre-assembled, transported in the folded position to the installation site, and then easily deployed for its installation on site.

To this end, the invention in particular provides for producing each of the various crossmembers 9 described hereinabove in the form of two half-crossmembers connected to one another by an articulation hinge so as to be able to pass from a deployed position to a folded position and vice versa.

Figure 3:
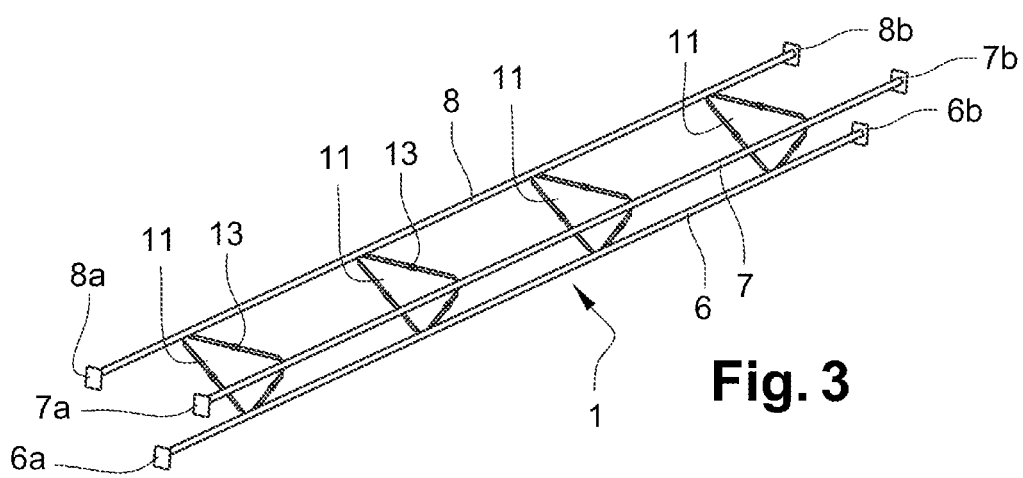
FIG. 3 illustrates in perspective a foldable truss structure conforming to one embodiment of the invention in a deployed position.

FIG. 3 represents, in deployed form, one example of a pre-assembled truss structure conforming to the invention in which are found again the three longitudinal members 6, 7 and 8 described above as well as crossmembers distributed to form, in the deployed position of the structure, various triangles 11 (four triangles 11 in FIG. 3) each contained in a plane perpendicular to the main extension direction of the longitudinal members 6, 7 and 8. In this FIG. 3 the references 6a, 7a and 8a represent end parts of the longitudinal members 6, 7 and 8 situated on the lefthand side of the truss structure and the references 6b, 7b and 8b represent end parts of the longitudinal members 6, 7 and 8 situated on the righthand side of the truss structure. As can more particularly be seen in FIG. 4, these end parts form fixing plates extending perpendicularly relative to the longitudinal direction of their respective longitudinal member. It is therefore possible, if required to cover a length greater than that of the longitudinal members 6, 7 and 8 of the structure 1, to connect a plurality of truss structures in the deployed position, by connecting them end-to-end by means of the fixing plates.

Figure 4:
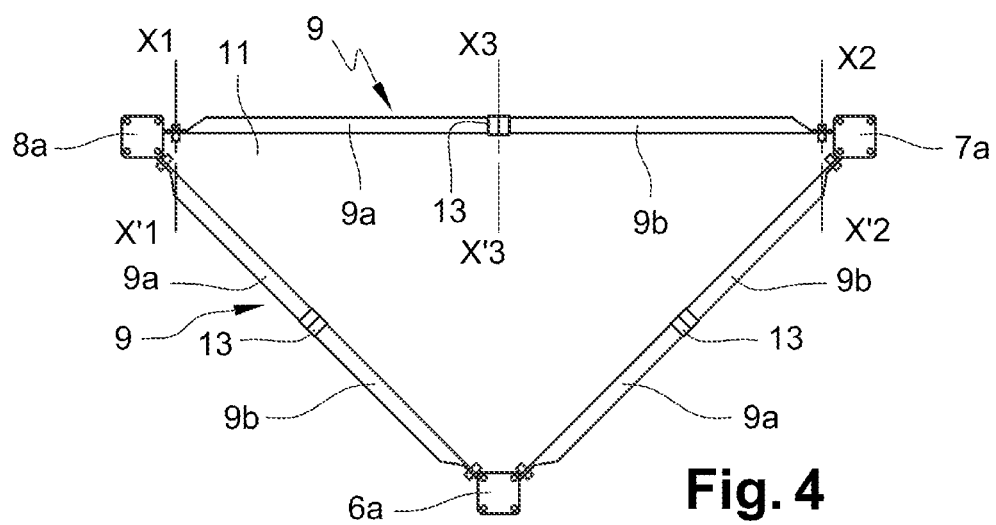
FIG. 4 illustrates an end view of the truss structure from FIG. 3 in the deployed position.
Figure 5:
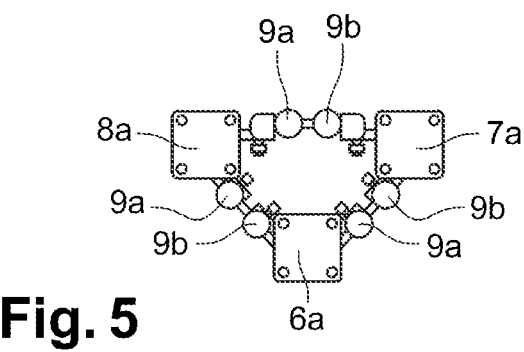
FIG. 5 illustrates an end view of the truss structure from FIG. 3 in a folded position.

FIG. 4 represents this same structure in this same deployed position as seen from the lefthand side of the structure. In this view only one triangle 11 including three foldable crossmembers 9 conforming to the invention can therefore be seen.

Each of the crossmembers 9 that mechanically connects two of the three longitudinal members 6, 7 and 8 described above includes, in accordance with the invention:

a first half-crossmember 9a with a first end connected in a pivoting manner to one of the two longitudinal members so as to be able to pivot about a first rotation axis (X1-X'1) and a second end (referenced 14a in FIGS. 7 and 8) opposite the first end; and a second half-crossmember 9b with a first end connected in a pivoting manner to the other of the two longitudinal members so as to be able to pivot about a second rotation axis (X2-X'2) and a second end (referenced 14b in FIGS. 7 and 8) connected to the second end of the first half-crossmember 9a by an articulation hinge 13 allowing relative rotation of the two half-crossmembers 9a, 9b about a third rotation axis (X3-X'3).

Figure 6:
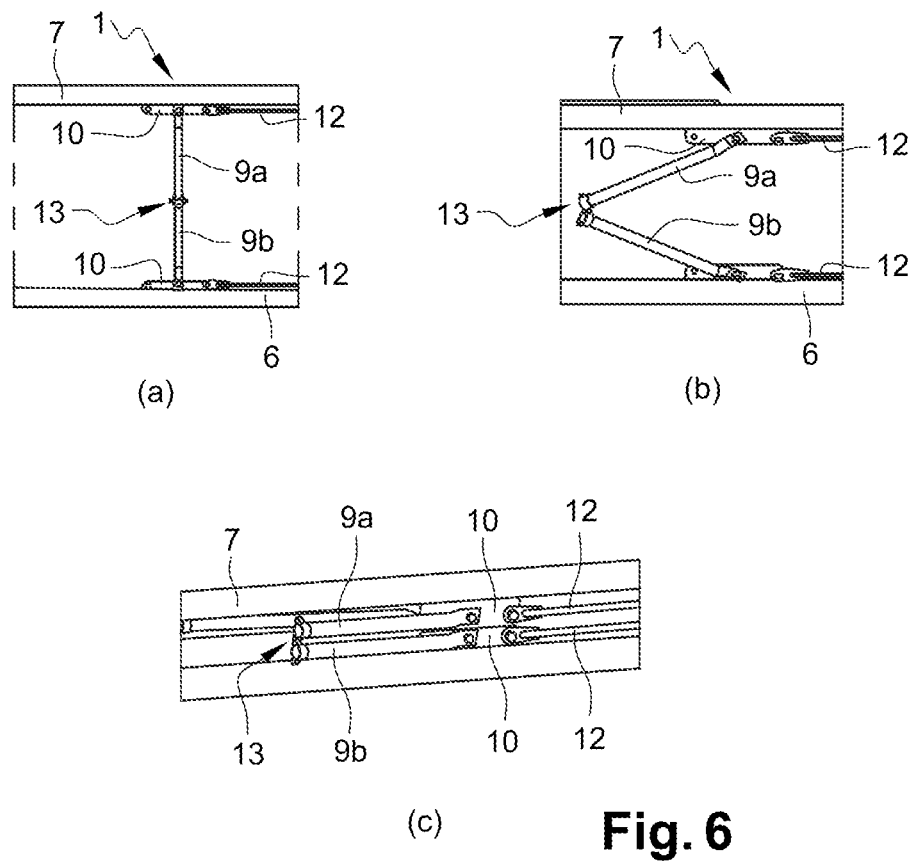
FIG. 6 represents partly a truss structure according to one embodiment conforming to the present invention in different views and at different positions of the structure from a deployed position to a folded position via an intermediate position.

The first ends of the two half-crossmembers 9a, 9b are preferably connected in a pivoting manner to the longitudinal members by means of plates 10 fixed to the longitudinal members (see in particular FIG. 6).

So as not to overload FIG. 4, only the first, second and third rotation axes associated with the hinge 9 situated in the upper part of FIG. 3 have been represented. These three rotation axes (X1, X'1), (X2, X'2) and (X3, X'3) extend parallel to one another, but each is orthogonal to the main extension direction of the longitudinal members. This arrangement enables the truss structure 1 as well as each crossmember 9 to pass from a deployed position to a folded position and vice versa.

The deployed position, represented in various views in FIGS. 3, 4, 6(a), 8, 12(d) and 13, corresponds to a position in which the first and the second crossmembers 9a and 9b of each crossmember 9 extend in line with one another in a direction orthogonal to the main extension direction. In this deployed position the crossmembers 9 form the various triangles 11 mentioned above, thus positioning the longitudinal members 6, 7 and 8 in their definitive relative positions.

The folded position, represented in various views in FIGS. 5, 6(c), 11 and 12(a), corresponds for its part to a position in which the first and second crossmembers 9a, 9b of each crossmember 9 extend substantially parallel alongside one another in the main extension direction. In this folded position the three longitudinal members 6, 7 and 8 remain parallel to one another but are moved closer to one another to form a very compact structure.

FIGS. 6(b), 7, 10, 12(b), 12(c) show different views of the structure in intermediate positions.

The articulation hinges 13 of the various crossmembers 9 can preferably be locked when the truss structure 1 is in the deployed position and unlocked to allow the folding of the crossmembers and of the structure.

One possible embodiment of a lockable articulation hinge 13 connecting two half-crossmembers 9a, 9b will now be described with reference to FIGS. 7 to 9. In this nonlimiting embodiment the two half-crossmembers 9a, 9b are half-tubes of the same circular section. Other sections may be envisaged without departing from the scope of the present invention, for example square or rectangular sections, with the geometry of the hinge 13 modified.

Figure 7:
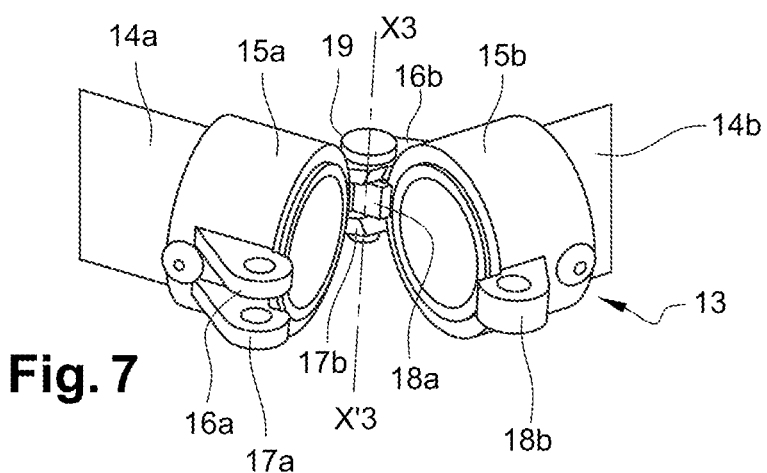
FIG. 7 illustrates partly a crossmember equipped with an articulation hinge in a semi-deployed position in accordance with one possible embodiment of the invention.

FIG. 7 represents partly the two half-crossmembers in a semi-deployed position with the articulation hinge 13 in the unlocked position.

The articulation hinge 13 includes two sleeves, here in the form of rings, namely a first sleeve 15a fixed to the second end 14*a* of the lefthand half-crossmember and a second sleeve 15*b* fixed to the second end 14*b* of the righthand half-crossmember.

The first sleeve 15*a* includes at its periphery:
- a first and a second lateral lug 16*a*, 17*a* extending facing and radially relative to the first sleeve 15*a* and each pierced by an orifice;
- a third lateral lug 18*a* extending radially relative to the first sleeve 15*a* and diametrically opposite the facing first and second lateral lugs 16*a*, 17*a*, this third lateral lug 18*a* also being pierced by an orifice.

In an analogous manner the second sleeve 15*b* includes at its periphery:
- a first and a second lateral lug 16*b*, 17*b* extending facing and radially relative to the second sleeve 15*b* and each pierced by an orifice;
- a third lateral lug 18*b* extending radially relative to the second sleeve 15*b* and diametrically opposite the facing first and second lateral lugs 16*b*, 17*b*, this third lateral lug 18*b* also being pierced by an orifice.

Figure 8:
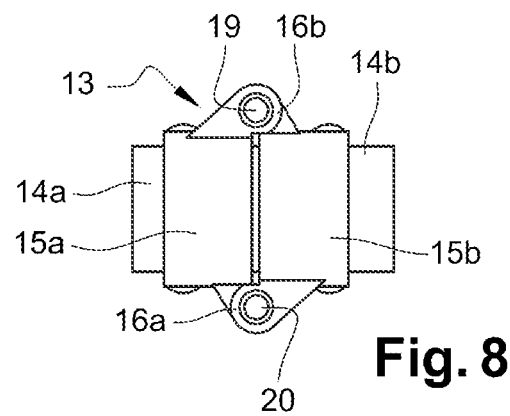
FIG. 8 illustrates partly the crossmember from FIG. 7 equipped with the hinge in the deployed and locked position.
Figure 9:
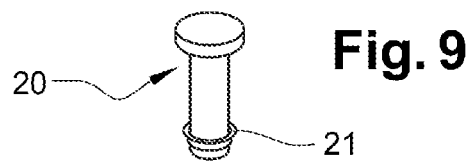
FIG. 9 represents a locking pin able to lock a crossmember equipped with the articulation hinge from FIGS. 7 and 8 in its deployed position.

The two sleeves 15*a* and 15*b* are arranged and the various lateral lugs are disposed in such a manner that:
- the third lateral lug 18*a* of the first sleeve 15*a* can come to be placed between the first and second lateral lugs 16*b*, 17*b* of the second sleeve 15*b* with their corresponding orifices aligned to receive a first locking pin 19;
- the third lateral lug 18*b* of the second sleeve 15*b* can come to be placed between the first and second lateral lugs 16*a*, 17*a* of the first sleeve 15*a* with their corresponding orifices aligned to receive a second locking pin 20 (FIGS. 8 and 9).

In the semi-deployed situation represented in FIG. 7 in which only the pin 19 is received through the aligned orifices of the lugs 16*b*, 17*b* and 18*a* when the other pin 20 is not in place, the two half-crossmembers 9*a*, 9*b* are therefore connected in a manner mobile in rotation about the articulation axis defined by the longitudinal axis of the pin 19, corresponding to the rotation axis (X3, X'3) described above.

The symmetry conferred on the arrangement of the sleeves and of the pierced lateral lugs advantageously make it possible to choose alternatively as an articulation axis for the hinge an axis that would be defined by the longitudinal axis of the pin 20 when the latter is received through aligned orifices of the lugs 16*a*, 17*a* and 18*b* when the other pin 19 is not in place.

FIG. 8 illustrates the two half-crossmembers in the deployed position and the articulation hinge 13 in the position locked by fitting the locking pin 20. As represented in FIG. 9, the locking pin 20 is preferably equipped at its lower end with a conical elastic flange 21 enabling rapid fitting by clipping. The pin 19 is preferably identical to the pin 20.

As can be seen in FIG. 8, once the hinge 13 is locked the ends 14*a* and 14*b* of the two half-crossmembers are indeed in bearing engagement plane on plane, corresponding to a situation of alignment of the two half-crossmembers. Such alignment is important because the crossmembers are structural elements that will function in compression.

Figure 10:
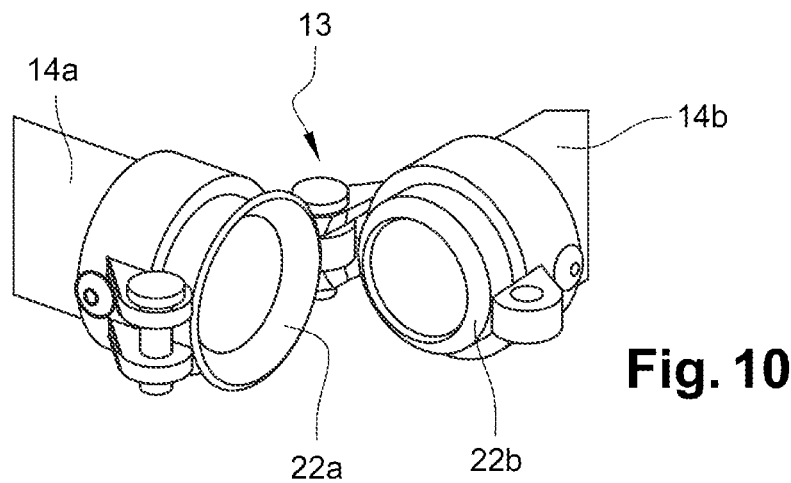
FIG. 10 illustrates partly a crossmember equipped with an articulation hinge in a semi-deployed position according to a variant embodiment conforming to the invention.

To guarantee excellent centring between the two half-crossmembers there may further be provision for one of the two half-crossmembers to be provided with a male cone shape end adapted to be received in a female counter-cone shape provided at the end of the other half-crossmember when the crossmember including the two half-crossmembers is in the deployed position. For example, FIG. 10 illustrates the end 14*a* of the lefthand half-crossmember provided with a female counter-cone 22*a* and the end 14*b* of the righthand half-crossmember provided with a male cone.

The fact of rendering the truss structure 1 foldable in accordance with the invention is not incompatible with the fact that the structure may include, in one possible embodiment and in an analogous manner to the known structure described with reference to FIGS. 1 and 2, one or more tie-rods each mechanically connecting two plates 10 of two longitudinal members between two apexes of two successive triangles 11 in the deployed position.

Figure 11:
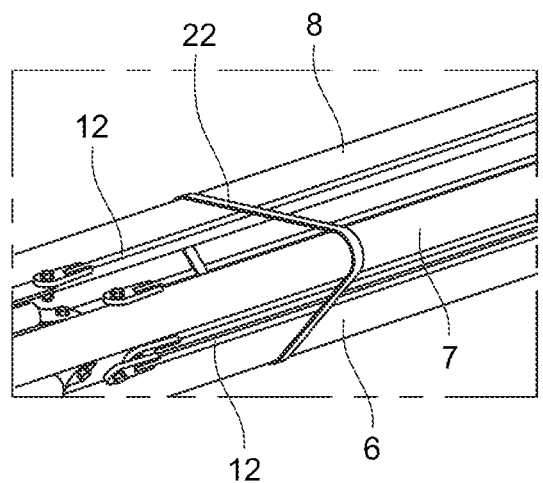
FIG. 11 illustrates partly a truss structure with tie-rods in the folded position suitable for transport.
Figure 13:
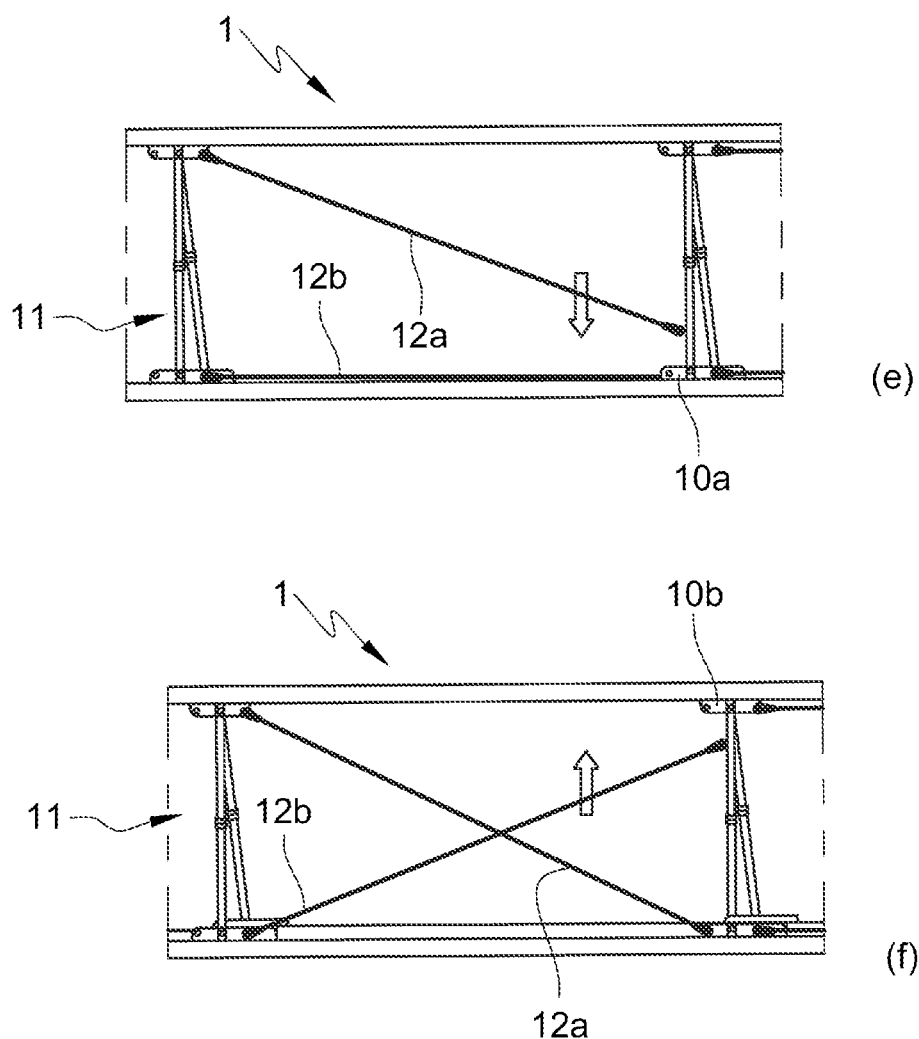
FIG. 13 illustrates a part of a sequence of deployment of a truss structure conforming to the invention when that structure is further equipped with tie-rods.

The presence of such tie-rods can be seen in particular in FIGS. 6 and 11 (tie-rods referenced 12) and in FIG. 13 (tie-rods referenced 12*a* and 12*b*).

Nevertheless, to render the structure foldable in this situation, the tie-rod must comprise two ends each connected in an articulated manner to one of the two plates 10, one of the two ends being adapted to be disconnected in such a manner as to allow the passage of the structure 1 from its deployed position to its folded position.

In the folded position of the structure each tie-rod extends substantially in said main extension direction.

To hold the structure in the folded position and to keep the various tie-rods pressed correctly along the longitudinal members there may advantageously be provision for disposing around the folded structure one or more encircling bands, such as the flexible tie 22 illustrated in FIG. 11.

A method of installing a foldable truss structure conforming to the invention will now be described with reference to FIG. 12, which illustrates four steps (a) to (d) of a sequence of deploying the truss structure 1 described above from its folded position to its deployed position and then with reference to FIG. 13 which illustrates three steps (d) to (e) in the deployment of the tie-rods.

Figure 12:
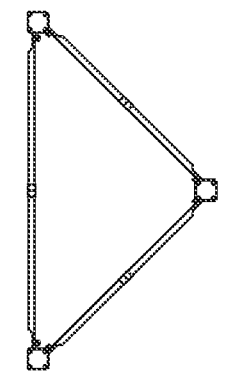
FIG. 12 illustrates in different views a sequence of deployment of a truss structure conforming to the invention.
Figure 12:
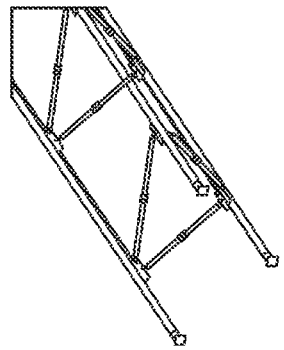
Figure 12:
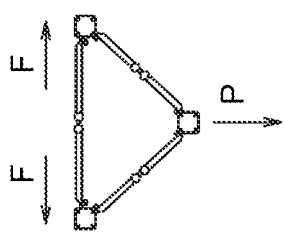
Figure 12:
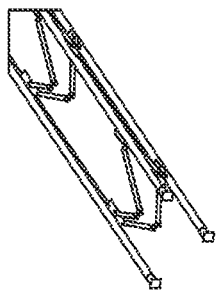
Figure 12:
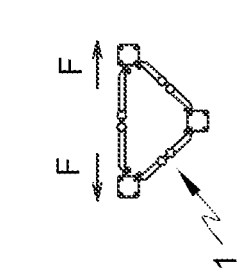
Figure 12:
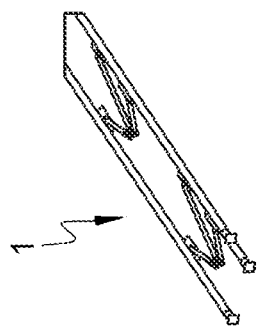
Figure 12:
Figure 12:
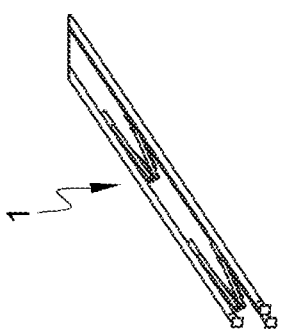

For each step (a) to (d), FIG. 12 gives a partial view in perspective of the structure as well as an end view:
- step (a): the truss structure 1, once arrived on the installation site in its folded position to facilitate its transport, is lifted and suspended by two of its upper longitudinal members 7 and 8;
- steps (b) to (d): the two longitudinal members by which the structure is suspended are moved away from one another (arrows F). The lower longitudinal member 6 is moved away under its own weight (arrow P). The crossmembers will be unfolded by the effect of the separation of the longitudinal members as far as their totally unfolded positions (step (d)).

At the end of step (d), a locking pin can then be inserted in order to lock each articulation hinge of each crossmember in the deployed position.

When the truss structure 1 further includes tie-rods such as the two tie-rods 12*a* and 12*b* represented in FIG. 13, the following additional steps are carried out:
- step (e): the tie-rod 12*a* (one end of which is already connected to the structure as explained hereinabove) is moved in such a manner as to position its non-connected second end toward the corresponding fixing plate 10*a* in order to be able to fix that second end with the aid of a nut-and-bolt system;
- step (f): the tie-rod 12*b* (one end of which is already connected to the structure as explained hereinabove) is moved in such a manner as to position its non-connected second end toward the corresponding fixing plate 10*b* so as to be able to fix that second end.

The benefit of the foldable structure described hereinabove is of course not limited only to the solar tracker table support structure application field. The foldable structure in accordance with the principle of the invention may be used in numerous fields where questions of transporting and installing structures arise.

Moreover, although the truss structure has been described in the context of an assembly constituted of only three parallel longitudinal members held spaced from one another with the aid of crossmembers distributed in triangles, the principle of folding the structure through the use of foldable crossmembers may be extended to structures including only two longitudinal members or to structures including more than three longitudinal members. In all cases the parallel longitudinal members are held spaced from one another with the aid of crossmembers distributed in polygons the order of which is equal to the number of longitudinal members. Thus in the case of a structure with two longitudinal members for example the polygons obtained are degenerate second order polygons corresponding to a segment.

The invention claimed is:

1. A truss structure including:
   an assembly constituted of a number greater than or equal to two of longitudinal members extending parallel to one another in a main extension direction; and
   crossmembers distributed along the main extension direction and configured to connect the longitudinal members mechanically two by two so that the crossmembers are able to form a plurality of polygons each contained in a plane perpendicular to said main extension direction;
   wherein each crossmember connecting two longitudinal members includes:
   a first half-crossmember that has a first end connected in a pivoting manner to one of the two longitudinal members so as to be able to pivot about a first rotation axis and a second end opposite the first end; and
   a second half-crossmember that has a first end connected in a pivoting manner to the other of the two longitudinal members so as to be able to pivot about a second rotation axis and a second end connected to the second end of the first half-crossmember by an articulation hinge allowing relative rotation of the two half-crossmembers about a third rotation axis, the first, second and third rotation axes being parallel to one another and orthogonal to said main extension direction so as to allow the truss structure and each crossmember to pass from a deployed position to a folded position and vice versa,
   said deployed position corresponding to a position in which the first and the second half-crossmembers of each crossmember extend in line with one another in a direction orthogonal to said main extension direction so that the crossmembers form said plurality of polygons, and said folded position corresponding to a position in which the first and the second half crossmembers of each crossmember extend substantially parallel one alongside the other along said main extension direction,
   the articulation hinge of each crossmember being able to be locked in the deployed position and unlocked to allow folding of the crossmembers and of the truss structure, and the articulation hinge of each half-crossmember including a first sleeve fixed to one end of one of the two half-crossmembers and a second sleeve fixed to an end of the other of the two crossmembers, each sleeve comprising at its periphery:
   a first and a second lateral lug extending facing and radially relative to the sleeve and each pierced by an orifice;
   a third lateral lug extending radially relative to the sleeve and diametrically opposite the first and second lateral lugs, said third lateral lug being also pierced by an orifice.

2. The truss structure according to claim 1, wherein said assembly is constituted of three longitudinal members, the polygons formed by the crossmembers in the deployed position being triangles.

3. The truss structure according to claim 1, wherein the end of one of the two half-crossmembers has a male cone shape that can be received in a female counter-cone shape provided at the end of the other of the two half-crossmembers in the deployed position.

4. The truss structure according to claim 1, wherein said truss structure constitutes a support structure able to support at least partly a table of a solar tracker equipped with at least one solar energy collector device.

5. The truss structure according to claim 1, wherein said truss structure is included in a solar tracker,
   said solar tracker comprising:
   a mobile device comprising a table equipped with at least one solar energy collector device, a support structure extending longitudinally over a length L to support said table, a first support arch and a second support arch configured to support said support structure;
   a first ground support and a second ground support respectively configured to support the first support arch and the second support arch; and
   a kinematic driving device configured to drive the mobile device in rotation relative to the first ground support and to the second ground support;
   wherein said support structure of said solar tracker, includes said at least one truss structure.

6. The truss structure according to claim 5, wherein said support structure of said solar tracker is composed of a plurality of said truss structures, connected end-to-end.

7. The truss structure according to claim 1, wherein:
   the third lateral lug of the first sleeve can come to be placed between the first and second lateral lugs of the second sleeve with their corresponding orifices aligned to receive a first locking pin; and
   the third lateral lug of the second sleeve can come to be placed between the first and second lateral lugs of the first sleeve with their corresponding orifices aligned to receive a second locking pin.

8. The truss structure according to claim 7, wherein said third rotation axis is defined by the longitudinal axis of the first locking pin when the latter is received through the corresponding orifices in the absence of the second locking pin.

9. The truss structure according to claim 7, wherein said third rotation axis is defined by the longitudinal axis of the second locking pin when the latter is received through the corresponding orifices in the absence of the first locking pin.

10. The truss structure according to claim 7, wherein the first locking pin and/or the second locking pin include(s) a conical elastic flange for rapid assembly by clipping.

11. The truss structure according to claim 1, wherein the first ends of the half-crossmembers are connected in a pivoting manner to the longitudinal members by means of plates fixed to the longitudinal members.

12. The truss structure according to claim 11, wherein in the deployed position it includes at least one tie-rod mechanically connecting two plates of two longitudinal members between two apexes of two successive polygons.

13. The truss structure according to claim 12, wherein said at least one tie-rod comprises two ends each connected in an articulated manner to one of the two plates, one of the two ends being able to be disconnected so as to allow the passage of the structure from its deployed position to its folded position.

14. The truss structure according to claim 13, wherein, in the folded position, said at least one tie-rod extends substantially in said main extension direction.

\* \* \* \* \*